United States Patent [19]
Kissick, Jr. et al.

[11] Patent Number: 5,199,378
[45] Date of Patent: Apr. 6, 1993

[54] AQUARIUM FILTERING SYSTEM AND METHOD

[76] Inventors: William E. Kissick, Jr., 911 Cramer Ave., Apt. 1, Lexington, Ky. 40502; Jay P. Frickman, 2365 Madison Rd., #209, Cincinnati, Ohio 45208; Kevin R. McMahon, 41 Villa Pl., Fort Thomas, Ky. 41075

[21] Appl. No.: 816,521

[22] Filed: Dec. 23, 1991

Related U.S. Application Data

[63] Continuation of Ser. No. 515,063, Apr. 26, 1990, abandoned, which is a continuation-in-part of Ser. No. 237,930, Aug. 29, 1988, Pat. No. 4,921,614.

[51] Int. Cl.$^5$ .............................................. A01K 63/00
[52] U.S. Cl. .................................................... 119/5
[58] Field of Search ........................ 119/3, 5; 210/169

[56] References Cited

U.S. PATENT DOCUMENTS

| | | | |
|---|---|---|---|
| 3,529,574 | 9/1970 | Kelley | 210/169 |
| 3,693,798 | 9/1972 | White | 210/169 |
| 3,722,685 | 3/1973 | Orensten et al. | 210/169 |
| 3,759,223 | 9/1973 | D'Andrea | 119/5 |
| 3,785,342 | 1/1974 | Rogers | 119/5 |
| 3,814,254 | 6/1974 | Schatz | 210/169 |
| 3,817,382 | 6/1974 | Arneson | 210/169 |
| 4,123,359 | 10/1978 | Smith | 210/169 |
| 4,216,090 | 8/1980 | Dockery | 210/169 |
| 4,369,735 | 1/1983 | Van Gaalen | 119/3 |
| 4,752,388 | 6/1988 | Ng | 210/169 |
| 4,921,614 | 5/1990 | Frickman et al. | 119/5 X |
| 4,957,623 | 9/1990 | Henzlik | 210/169 |
| 5,062,951 | 11/1991 | Tominaga | 119/5 X |
| 5,066,394 | 11/1991 | Harrison | 119/5 X |
| 5,092,268 | 3/1992 | Taylor | 119/3 |

FOREIGN PATENT DOCUMENTS

| 2042148 | 12/1971 | Fed. Rep. of Germany | 15/220 A |
| 2105977 | 4/1983 | United Kingdom | 15/220 A |

*Primary Examiner*—Robert P. Swiatek
*Attorney, Agent, or Firm*—Frank C. Leach, Jr.

[57] ABSTRACT

A system and method is presented for filtering waste and debris from an aquarium tank and from the water supply therein without having to empty the tank or remove the fish therefrom. The invention generally includes a movable cleaner positioned adjacent the bottom surface of the tank, mechanism for moving the cleaner along the bottom surface of the tank so that the movable cleaner dislodges waste and debris deposited thereon and directs the dislodged waste and debris toward an aperture to be conducted away from the bottom surface of the tank. The movable cleaner preferably comprises a barrier structure and moving means preferably comprises mechanical structure positioned externally of the tank. The waste-carrying water may be filtered and then returned to the aquarium or replaced with fresh water.

31 Claims, 3 Drawing Sheets

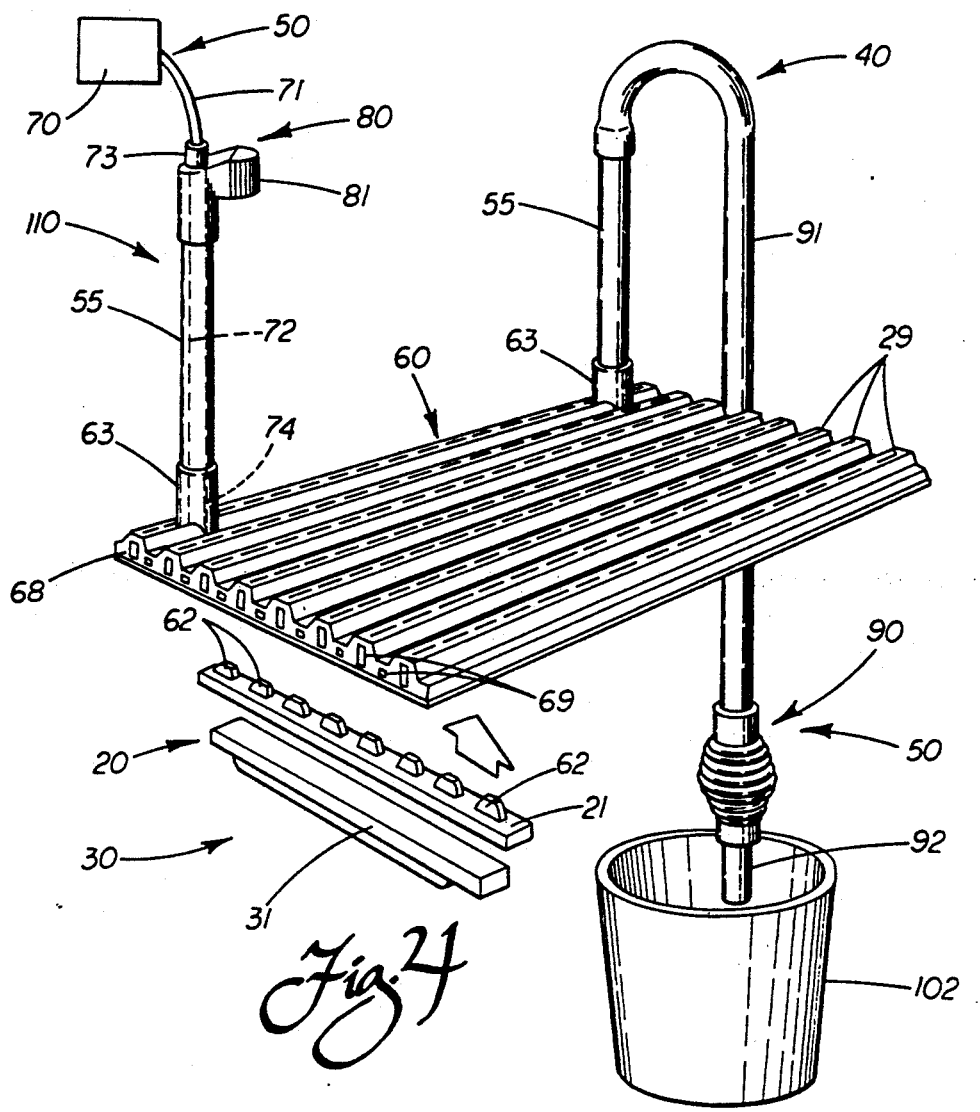
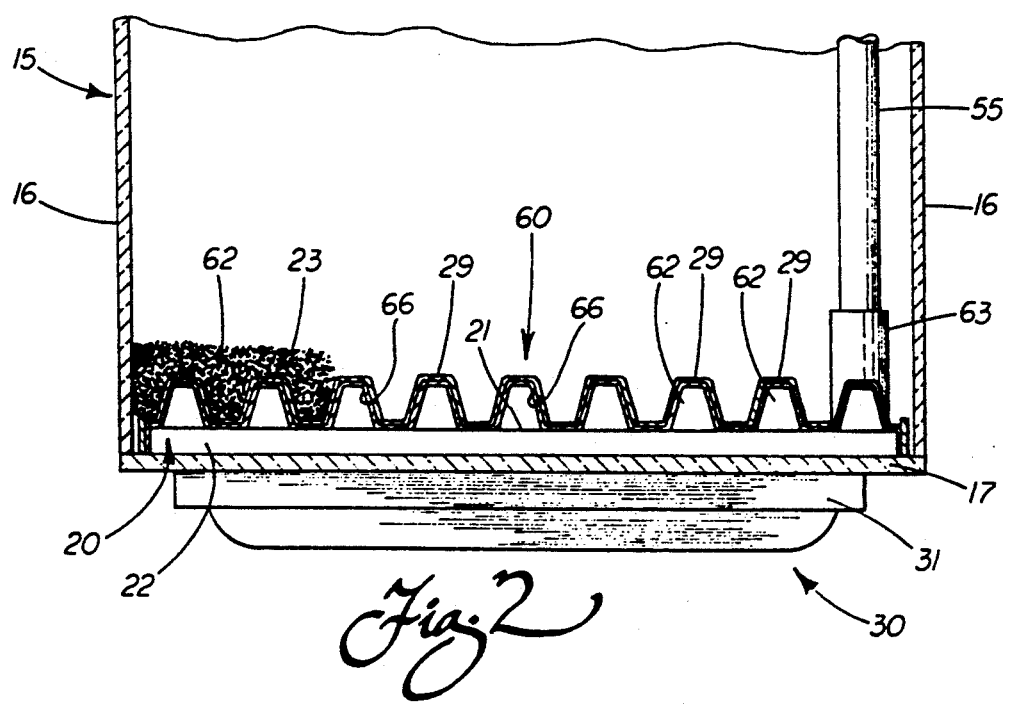

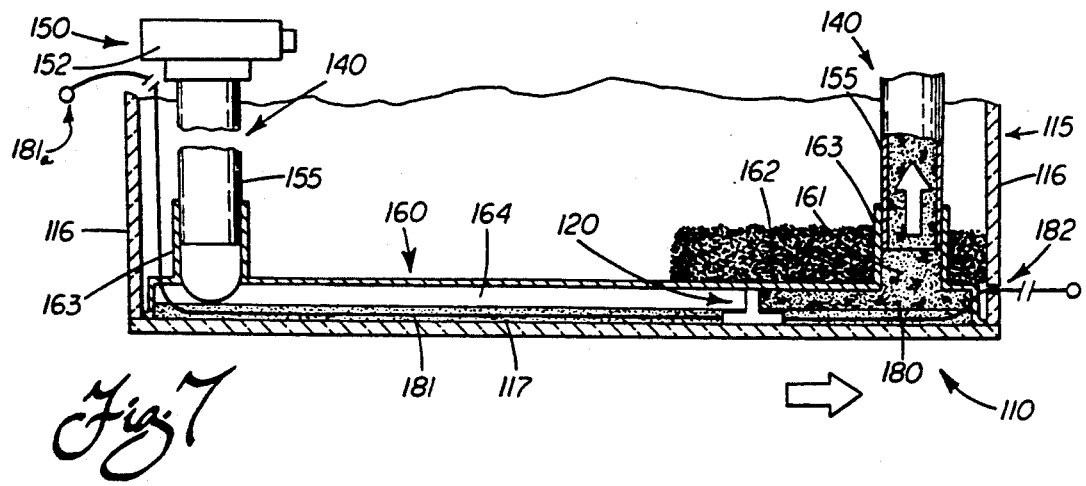
Fig. 7
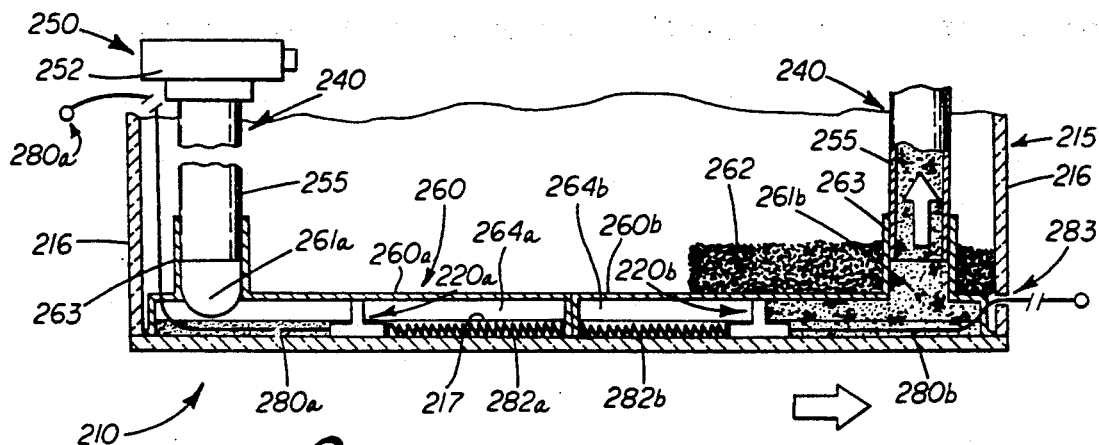
Fig. 8
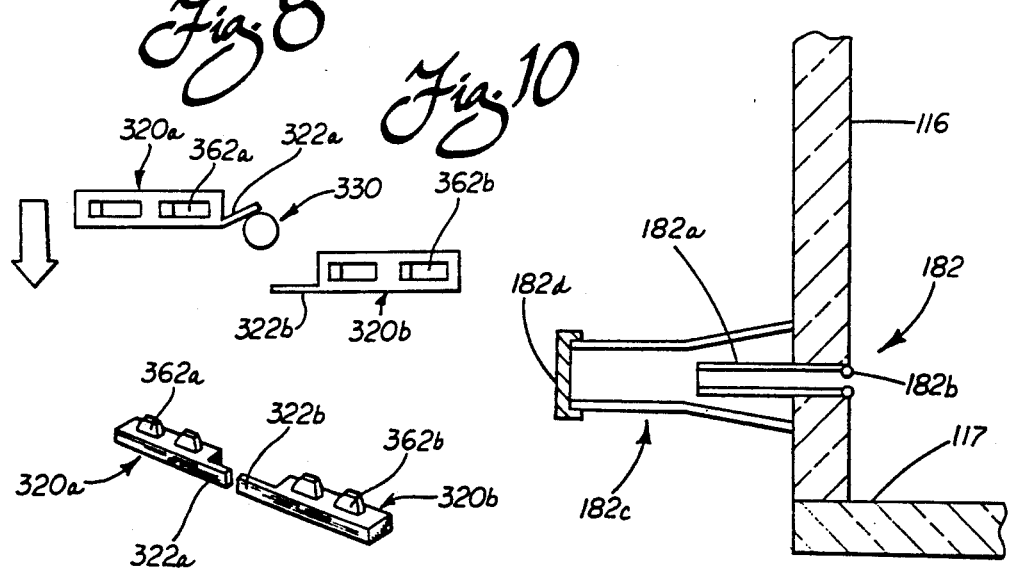
Fig. 10
Fig. 11
Fig. 9

AQUARIUM FILTERING SYSTEM AND METHOD

This is a continuation of application Ser. No. 515,063, filed Apr. 26, 1990, now abandoned, which is a continuation-in-part of allowed U.S. patent application Ser. No. 07/237,930, filed Aug. 29, 1988, which issued as U.S. Pat. No. 4,921,614 on May 1, 1990.

TECHNICAL FIELD

This invention relates to systems and methods for maintaining fish aquariums, and more particularly, to a system and method for removing particulate waste deposits and chemical impurities from an aquarium tank and the water supply retained therein.

DESCRIPTION OF THE PRIOR ART

A common problem experienced by owners of domestic fish aquariums is the necessity of periodically cleaning the aquarium and its components and continuously filtering its water supply to remove dissolved organic waste matter, particulate debris, chemical impurities such as ammonia and nitrate, and the like. The aquatic plants and animals living in an aquarium continuously shed or secrete particulate debris and dispense chemical impurities into the water supply, and it is therefore necessary that the tank be routinely cleaned and that the water supply be continuously filtered to maintain a healthy environment in which the aquatic plants and animals may live.

Most commercial systems for removing impurities from aquarium water generally employ two separate processes, individually or in combination: mechanical filtration and biological filtration. Mechanical filtration refers to the removal of particulate matter from suspension within the water supply by mechanical means and involves passing the contaminated water through a porous medium (i.e., filter) that retains the suspended material. The filter may be periodically replaced with a new filter to maintain its effectiveness. Biological filtration refers to the degradation by bacterial activity of the nitrogenous organic wastes released into the water by the aquatic life into simpler inorganic compounds. Management of this nitrogen cycle is one of the most important aspects of maintaining a fish aquarium successfully as the level of toxic metabolites must be kept from rising to fatal levels.

Filtration systems differ greatly in the relative importance they accord to mechanical or biological filtration. In a mechanical filtration system, the object is to remove as much of the organic matter as possible from the tank before it is broken down by bacterial action. In biological filtration systems, the object is the progressive degradation of the organic waste into simpler, less harmful inorganic compounds within the tank.

The size of the tank and the size and type of fish maintained in the aquarium generally dictate which type of filtration system is required. For example, if cichlids (a common tropical fish) are maintained, a primarily biological filtration system gives satisfactory results in lightly stocked tanks up to 50 gallons housing cichlids in the dwarf to middle-sized range. If stocking is increased or large species are maintained, supplementary mechanical filtration becomes necessary. In tanks greater than 50 gallons, the relative importance of mechanical filtration increases proportionally with the tank volume regardless of the types of fish maintained. Effective mechanical filtration is absolutely necessary when very large fish are maintained for the volume of waste produced by the fish will render ineffective even the most efficient biological filtration system.

There are generally two types of mechanical filtration systems used in most tank systems: passive units or powered units. Passive units rely on siphon action or induced flow to carry the aquarium water into a filtering device, from where it is returned to the main water supply. Passive units are not self-priming and must be monitored continuously to ensure their operation. Powered units rely on a rotary impeller device, commonly referred to as a "power head," or a pump to pull or direct water into the filtering box, where the water returns to the main water supply after passing through the filter media.

As noted, a biological filtration system relies upon a community of bacteria to break down the complex nitrogenous organic waste into simple inorganic nitrogen compounds. A commonly used biological filtration system is the "undergravel" filtration system in which the water is induced to flow downwardly through the gravel filter bed, by an air-bubbling means in a passive biological system, or by a power head in a powered biological system.

Aquariums employing an undergravel filtration system generally include a perforated structure supported adjacent the bottom of the tank which supports a layer of gravel or similar rock material thereon, and aerating means and water directing means for circulating air through the water to both supply oxygen to the aquatic plants and animals and to induce the water in the tank to circulate downwardly through the gravel bed and the perforated structure. The perforations in the support structure allow water and particulate matter to flow therethrough but prevent the gravel material from passing therethrough. The gravel bed acts to filter out physical impurities suspended in the water, such as organic fish waste, and a community of aerobic bacteria living in the gravel bed convert the organic waste into non-toxic gases which are then released into the water supply. The effectiveness of such a system generally depends upon the rate of water flow downwardly through the gravel bed.

A prior filtration system for removing impurities from a fish aquarium water supply is disclosed in U.S. Pat. No. 4,752,388, which provides an undergravel fish tank filter comprising a filter means, a rigid support for a gravel bed, and a drive means for causing water from below the support to flow through the filter means. The water drawn from the base of the fish tank first passes downwardly through the gravel bed resting on the support to filter out part of the impurities before the water is passed through the filter means. The drive means comprises a nozzle and an air tube where the nozzle extends upwardly from a chamber which is connected to the rigid support. Compressed air fed into the air tube issues therefrom in the form of bubbles which float upwardly from the tube, inducing a flow of water from below the structure to likewise flow upwardly through the filter means, and out of the nozzle back into the main water body of the tank.

A major shortcoming of undergravel filtration systems is that only a portion of the solid particulate matter in the water is trapped in the gravel bed and broken down by the bacteria; thus, a considerable portion of the matter passes through the perforations in the support structure and collects on the bottom surface of the tank. Furthermore, the draw created by the drive means is often insufficient to dislodge the particulate matter which deposits on the bottom surface, thereby failing to draw the particulate matter through the filtering device where it may become suspended in the filter media and be removed from the water supply. The tank, therefore, must still be cleaned periodically to remove the particulate waste deposits.

The conventional method of cleaning aquarium tanks having undergravel filtration systems generally requires that the aquatic plants and animals be removed from the tank along with the water, gravel, perforated structure and any other articles that may be within the tank. The gravel is then washed to remove the particulate matter deposited thereon, and the tank is cleaned manually by scrubbing the interior walls to remove the sedimentary deposits. This task is time-consuming, laborious and very unpleasant; and the periodic cleaning of aquariums is generally the maintenance chore most commonly despised by aquarium owners.

After the tank has been cleaned, the perforated structure, gravel and other articles are placed back in the tank, the tank is filled with fresh water and the fish and plants are returned to the tank. The fresh water used to refill the tank is normally not chemically equivalent to the water that was removed, and thus provides an uncomfortable aquatic environment for the plants and animals. The fish are shocked when they are put back into the tank and remain agitated by the chemically unbalanced water until the water approaches a proper chemical balance comfortable to the fish.

Other prior aquarium maintenance and filtration systems are exemplified by U.S. Pat. Nos. 3,759,223; 3,785,342; 4,098,230; 4,148,730; and 4,216,090. Efforts in the past to devise a system or method capable of eliminating the need to clean an aquarium tank utilizing an undergravel filtration system by hand have not been successful to date.

DISCLOSURE OF THE INVENTION

The present invention provides a method and apparatus for removing waste and debris and chemical impurities from an aquarium tank and the water supply retained therein without having to empty the tank or disturb the fish or other aquatic life therein.

The invention is particularly useful with aquarium systems that utilize an undergravel filtration system where the perforated support structure positioned adjacent the bottom surface supports a gravel bed thereon, and the support structure and the bottom surface of the tank define a lower compartment therbetween. In addition, a water aerating-and-directing means may be included for circulating air through the water to supply oxygen to the aquatic life and to induce the water to circulate downwardly through the gravel bed and the support structure.

The support structure of conventional underground systems is normally provided with at least one aperture formed therein and may further include a vertical conduit having one end connected to the aperture. If used, the aerating-and-directing means is normally connected to the other end of the conduit.

Apparatus according to this invention comprises a movable cleaning and dislodging means arranged adjacent the bottom surface of the tank adapted to remove waste and debris (hereinafter collectively referred to as "waste") from the bottom surface and means for moving the cleaning means along the bottom surface to engage and dislodge the waste and to direct the dislodged waste generally toward a location where it may be directed upwardly away from the bottom surface of the tank. Water expelling means may be employed with this invention that includes a vertical conduit and a water directing means connected to the conduit for drawing water containing the waste from adjacent the bottom surface of the tank upwardly through the aperture and the conduit.

The preferred embodiment of the barrier structure provided by this invention is constructed of a plastic material and a metallic component collectively encapsulated by a plastic or elastomeric material. The barrier structure extends from the bottom surface of the tank to substantially adjacent the underside of the perforated support structure, and the contour of the upper surface of the barrier structure corresponds to the contour of the underside of the support structure to substantially prevent the flow of waste around the moving barrier structure and to more efficiently clean and filter the tank.

The moving means according to a preferred embodiment of the invention includes a hand-held permanent magnet or other magnetic source applied externally to the underside of the tank to pull the barrier structure along the bottom surface of the tank by magnetic attraction to dislodge or otherwise displace the waste deposited thereon.

The water directing means that may be optionally employed with this invention comprises an electric pump or a siphon pump connected to the conduit to draw water upwardly into the conduit. In an alternative embodiment, this means may comprise an air pump which releases air bubbles adjacent the bottom of the conduit which then flow upwardly in the conduit and concomitantly induce water to likewise flow upwardly through the conduit. In this latter embodiment, the upper end of the conduit may be connected to a filtering device whereby the water carrying the waste and debris is directed through the filtering device and thereafter returned to the main water supply in the tank.

Alternatively, the conduit may be designed to direct water carrying waste and debris to an external receptacle in which the water may be disposed of and replaced by fresh water; or the water may be returned to the tank by introducing the water through a filtering device. In either embodiment, however, only a portion of the water is removed from the tank to be later replaced or returned to the tank. A substantial portion of the water supply will remain in the tank, making it unnecessary to remove the fish from the tank and thus minimizing the environmental shock to the fish.

A significant benefit of the invention is that it is capable of operating effectively without utilizing water directing means as the traversing movement alone of the barrier structure within the lower compartment forces or expels water carrying the waste upwardly through the aperture and conduit, thereby removing the waste from within the lower compartment of the tank.

The invention also provides a method for cleaning the aquarium and filtering its water supply comprising the steps of dislodging and moving waste and debris deposited on the bottom surface of the tank toward a location, and directing water upwardly from the location adjacent the bottom surface of the tank. The method of this invention may further include filtering the drawn water and directing the filtered water back into the tank, or, alternatively, directing the drawn water to a location external of the tank for treatment or disposal.

Further advantages and details of the invention will become apparent hereinafter in conjunction with the following detailed description of the best modes for carrying out the invention and the accompanying drawings.

BRIEF DESCRIPTION OF THE DRAWINGS

FIG. 2 is a partial end view of the tank of FIG. 1;

FIG. 4 is a perspective view illustrating further alternative embodiments according to the invention;

FIG. 7 is a schematic view of an aquarium tank incorporating cleaning and filtering apparatus according to alternative embodiments of the invention;

FIG. 8 is a schematic view of an aquarium tank incorporating cleaning and filtering apparatus according to an alternative embodiment of the invention;

FIG. 9 is a partial view of a fluid-tight orifice provided by the aquarium tanks of FIGS. 7 and 8;

FIG. 10 is a plan view of a barrier structure according to an alternative embodiment of the invention; an FIG. 11 is a perspective view of the barrier structure of FIG. 9.

BEST MODES FOR CARRYING OUT THE INVENTION

Figure 1:
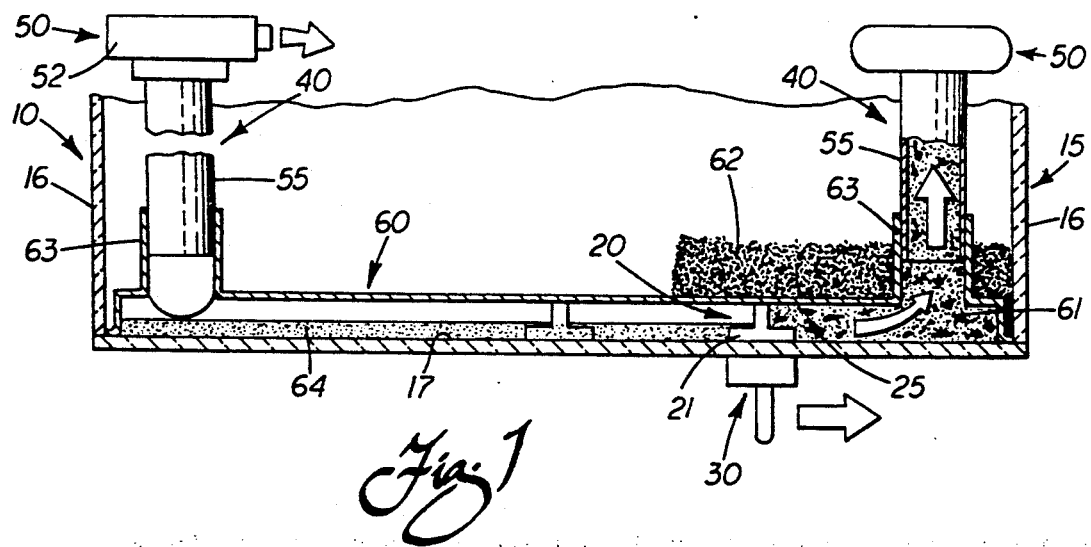
FIG. 1 is a schematic view of an aquarium tank incorporating cleaning and filtering apparatus according to a presently preferred embodiment of the invention.

Apparatus 10 for cleaning and filtering an aquarium according to a presently preferred embodiment of the invention is schematically illustrated in FIGS. 1 and 2. The aquarium includes a tank 15 having side walls 16 and a bottom surface 17. Apparatus 10 is particularly designed for use with an undergravel filtration system having a perforated support structure 60 positioned adjacent the bottom surface 17 of the tank and adapted to support a gravel bed 62 deposited thereon. Support structure 60 defines a lower compartment 64 between the structure and the bottom surface 17 of the tank and provides access to the lower compartment via a collar 63 defining an aperture 61 provided in the support structure. Support structure 60 may have two apertures 61, one each on the opposite sides thereof coupled with two conduits 55 connected to the apertures as shown in FIG. 1, or only a single aperture and conduit, or any combination thereof. Perforations 29 provided in the support structure (FIGS. 2 and 4) permit water to flow downwardly therethrough while preventing the gravel from falling therethrough. As indicated previously, the aerobic bacteria thriving in the gravel bed are not able to break down all of the waste in the water so a portion of the waste passes through the perforations 29 and accumulates on the bottom surface 17 requiring that it be cleaned periodically.

Apparatus 10 includes a movable cleaning and dislodging means 20 positioned adjacent bottom surface 17 and means 30 for moving cleaning means 20 along the bottom surface. As will be described more fully below, cleaning means 20 is movable along a path adjacent bottom surface 17 of the tank so that it slidably engages bottom surface 17, thereby dislodging particulate waste and debris collected thereon. The moving means 30 is adapted to direct cleaning means 20 generally toward a location, i.e., aperture 61 formed in perforated support structure 60, where the dislodged waste and debris may be directed upwardly through conduit 55.

Expelling means 40 is generally defined by vertical conduit 55 having one end positioned adjacent bottom surface 17 at aperture 61. One or more expelling means 40 for expelling waste and debris from the tank may be included. If desired, the other end of conduit 55 may be connected to a water directing means 50. Directing means 50 is adapted to draw water carrying dislodged waste and debris 25 from adjacent the bottom of the tank upwardly through conduit 55 to be processed or disposed of. Directing means 50 may be carried within the tank or located externally of the tank.

In a preferred embodiment, cleaning means 20 (illustrated in greater detail in FIGS. 2 and 4) comprises a barrier structure 21 which includes a metallic element 22 encapsulated within a plastic or elastomeric covering 23 to protect the metal from corrosion. The material from which barrier structure 21 is constructed is not essential to the effective operation of the invention as a variety of materials may prove satisfactory. For example, a barrier constructed of sponge material which encases a metallic element is also contemplated.

Moving means 30 preferably comprises a magnetic source 31 such as a hand-held permanent magnet which is adapted to be positioned externally of the underside of the tank to pull, by magnetic attraction, barrier structure 21 along bottom surface 17 in sliding engagement therewith to engage and dislodge waste and debris 25 therefrom and to direct the waste and debris toward aperture 61 and upwardly through conduit 55.

Where water directing means 50 is employed, means 50 draws the water carrying the waste from the lower compartment upwardly through conduit 55. In addition, as the barrier structure 21 is moved closer to the conduit 55, the suction created by the water directing means 50 is concentrated over an ever-decreasing volume; thus, the force of the suction will increase per unit of area in that decreasing space permitting waste to be more effectively drawn up into the conduit. The increased suction will also tend to draw waste that may have accumulated on the underside of the support structure into the conduit, and thus help to maintain the tank in a cleaner condition.

The system of the invention is operative without utilizing water directing means 50 as the barrier structure 21 may be moved back and forth in the lower compartment to produce a "flushing" effect which dislodges the waste and washes it from within the lower compartment through aperture 61. If conduit 55 is coupled to aperture 61, sufficient force is created by the movement of the barrier structure to direct the waste-carrying water upwardly through conduit 55 to a point external of the tank or possibly through a filtering media such as filter 80 shown in FIG. 4. The upper surface of the barrier structure is contoured to correspond to the contour of the support structure (FIGS. 2–4, 9 and 10), which allows the barrier structure to act in a fashion resembling a plunger traversing within the lower compartment to more efficiently dislodge the waste and push or direct the water and the waste toward aperture 61.

Barrier structure 21 may be moved at varying rates to satisfy the particular cleaning requirements of the individual tank. In fish tanks not employing a powered filtration system or in generally larger tanks or where the cleaning requirements are increased, barrier structure 21 must normally be moved at a greater rate to produce a flushing effect within the lower compartment sufficient to dislodge the waste deposited therein and to direct the water upwardly through the aperture to carry the waste out from within the lower compartment. If the cleaning requirements are lighter, the barrier structure may be moved at a slower rate to move only an amount of waste from within the lower compartment as necessary to maintain a healthy environment within the tank. The contoured upper surface of the barrier structure which corresponds with the contour of the underside of the gravel support structure 60 enhances the flushing or plunging effect produced by the barrier structure 21. If water directing means 50 is employed with the invention, barrier structure 21 may be moved at a slower rate due to the increased drawing force create by the water directing means 50. The filter media of filtering device 80, commonly provided by charcoal granules or angel hair or a combination thereof, should be replaced periodically to maintain the filtering capability of the media. Thus, this invention may be employed in a passive mechanical filtration system, which normally includes a water aerating means which induces water flow through a filter media by the use of air released within the tank, or a powered mechanical filtration system, which includes an electric pump or power head to direct the water through the filtering media.

Figure 3:
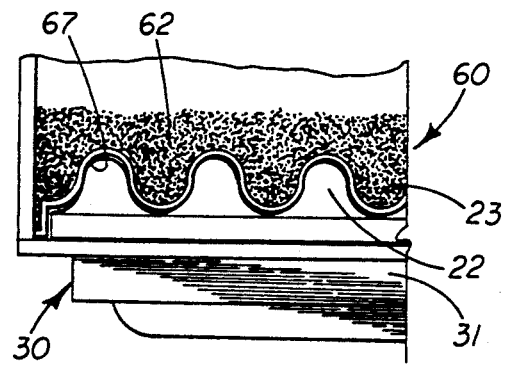
FIG. 3 is a partial end view of an aquarium tank according to an alternative embodiment of the invention.

Referring now to FIG. 2, support structure 60 has a plurality of longitudinal channels 66 formed therein and the upper surface of barrier structure 21 is provided with a plurality of corresponding ridges 62 which substantially mate with the channels 66. In FIG. 3, however, support structure 60 has rounded longitudinal troughs 67 formed therein and the upper surface of the barrier structure is shaped correspondingly to substantially mate with the troughs 67. If desired, the upper surface of barrier structure 21 may also be formed to be substantially flat so as to be usable universally with support structures of differing configurations; however, it is preferred that the upper surface generally correspond to the shape of the support structure to enable the barrier structure 21 to substantially prevent waste dislodged by the barrier structure and suspended in the water in front of the barrier structure from passing around the barrier structure during movement, thereby more effectively maintaining the waste in front of it to more effectively sweep and direct the waste toward aperture 61. The more closely the configuration of the barrier structure mates with the underside of the support structure, the more effectively the barrier acts as a plunger to dislodge and flush out the waste.

Although in the present embodiments illustrated herein only a single barrier structure is employed, two or more separate barrier structures may be used if desired. Multiple barrier structures may be preferred, for example, if the support structure includes support legs or posts or the like that would interfere with the movement of a single barrier structure along the bottom surface of the tank. When two or more barrier structures are utilized, they may be moved independently by the moving means or moved collectively.

Water directing means 50 may take various forms. To illustrate this, the water directing means 50 connected to the right conduit 55 in FIG. 1 is shown schematically. The water directing means connected to the left conduit 55 may comprise an electric fluid pump or power head 52. In FIG. 4, however, the water directing means 50 connected to the left conduit 55 includes an electric air pump 70 connected to an air stem 72 by hose 71. The air stem, shown in phantom lines arranged coaxially within conduit 55, has one end connected to air hose 71 and its other lower end 74 positioned adjacent the lower end of conduit 55 and the bottom surface of the tank. Air hose 71 is joined to air stem 72 at a junction 73 which provides a gas-tight seal for delivering compressed air from air pump 70 to air stem 72. A filtering device 80 is connected to the upper end of left conduit 55 to remove physical and chemical impurities from the water as the water passes therethrough. Filtering device 80 has a perforated inflow passage (not shown) coupled to the conduit 55, and a perforated outflow passage 81. The perforated inflow and outflow passages retain the filtering material within the device 80; and the perforated inflow passage additionally prevents large foreign objects, such as pieces of gravel, from entering the device while still allowing water carrying chemical and physical impurities to pass therethrough.

In operation, air pump 70 directs compressed air through air hose 71 and air stem 72 where it is released at end 74 in the form of bubbles which flow upwardly within conduit 55. The upward flow of the air bubbles within conduit 55 induces waste-carrying water to concomitantly flow upwardly through conduit 55 and through filtering device 80 to return to the main water supply of the tank through outflow passage 81. Filtering device 80 may be entirely disposable or designed to permit replacement of the filtering material retained therein.

Still another alternative embodiment of this invention is shown in the right assembly in FIG. 4 where water directing means 50 comprises a siphon pump 90 connected to conduit 55 by a siphon hose 91. Siphon pump 90 draws waste-carrying water from the lower compartment up through the conduit 55 and hose 91, through the pump and into a receptacle 102 through an outlet hose 92. Siphon hose 91 may alternatively be connected directly to collar 63, thereby alleviating the need for a separate conduit 55. In addition, where conduit 55 is not employed, collar 63 may be provided with a cap to close aperture 61 when not in use.

FIGS. 1 and 4 illustrate the use of different water directing means that may be used with this invention. In a system which includes two conduits providing access to the lower compartment of a tank, the same type of water directing means, if used at all, will normally be connected to both conduits, or a water directing means may be connected to only one of the conduits.

Furthermore, structure 60 need not necessarily have one or more apertures 61 formed therein to provide access to the lower compartment 64. Alternatively, at least one end 68 of the support structure may be spaced from the side wall of the aquarium tank and be provided with perforations 69 as shown in FIG. 4. In such an embodiment, the conduit 55 may be positioned so that its lower end is located at a point generally between the end 68 of the support structure and the wall 16 of the aquarium (FIG. 1).

Figure 6:
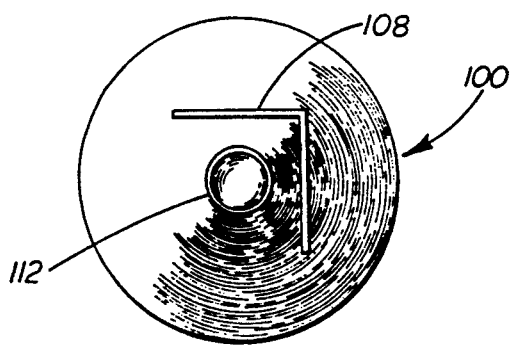
FIG. 6 is a bottom view of the filtering device of FIG. 5.
Figure 5:
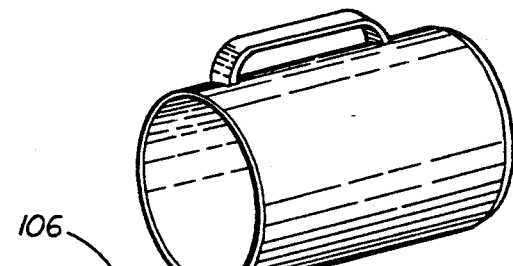
FIG. 5 is a partial perspective view of an aquarium tank illustrating yet even another alternative embodiment according to the invention.

FIGS. 5 and 6 illustrate yet even another alternative embodiment of this invention which includes an external filtering device 100. In the embodiments of FIGS. 5 and 6, waste-carrying water is drawn out from the lower compartment 64 of the tank by water directing means 50, or by the movement of barrier structure 21 within the lower compartment, and directed to a point externally of the tank where it may be collected in a receptacle 102 (FIG. 4). After the waste-carrying water is collected in receptacle 102, the water is then poured back into the main water supply through filtering device 100.

Filtering device 100 comprises a funnel-shaped member 104 having filtering material 106 deposited therein. Filtering material 106 may include, for example, charcoal granules, angel hair and/or spun glass, and the like. As shown in FIG. 6, filtering device 100 has an L-shaped bracket 108 affixed thereto to support the filtering device on an upper corner of the tank 15. Filtering device 100 material removes physical and chemical impurities from the water, and the filtered water then flows through outflow passage 110 and returns to the main water supply of the tank. A screen or mesh 112 can cover the outflow passage 110 to prevent the filtering material from passing through the outflow passage.

Filtering device 100 can also be used, if desired, to directly filter the water as it is being drawn from the lower compartment of the tank. For example, hose 91 (FIG. 4) may be arranged so that outlet hose 92 is positioned to introduce the waste-carrying water directly into filtering device 100.

Alternatively, water carrying the dislodged waste drawn from the tank may be disposed of and fresh water poured back into the tank to replenish the water supply. In addition, the water collected in receptacle 102 may be chemically treated with medicinal agents or water treatment agents, if desired, before the water is returned to the tank.

Mechanical means other than the magnetic means 31 may be employed to move barrier structure 21 along the bottom surface of the tank. One alternative embodiment of this invention is shown in FIG. 7 including pull means 180 connected to barrier structure 120. Apparatus 110 shown in FIG. 7 is substantially similar to apparatus 10 of FIG. 1 and like component parts of apparatus 110 correspond to the like parts of apparatus 10; that is, conduit 55 and water expelling means 40 of FIG. 1 correspond to conduit 155 and expelling means 140 of FIG. 7, and so on. Pull cords 180 are attached to barrier 120 by conventional fasteners and may be pulled in the desired direction to move barrier structure 120 to dislodge waste and debris 164 which has deposited on the bottom surface 117 of the tank and direct the waste to aperture 161 where the waste may be directed upwardly through conduit 155. Water directing means 150 may be used if desired to more effectively draw the water upwardly through conduit 155. Alternatively, the mere force produced by the movement of barrier 120 will flush the waste-carrying water out of the lower compartment 164. In one embodiment as shown at the right of FIG. 7, cord 180 extends through apertures provided in the end of support grid 160 (appearing as apertures 69 in FIG. 4) and through fluid-tight orifice 182 formed in the wall 116 of the tank. Pull means 180 is defined by flexible cords but may also be provided by rigid or semiflexible rods or pull bars attached to the barrier 120. If bars or rods are desired, they may be telescopic, or in the alternative, be provided with extending portions that are threadably connected to the rods to avoid having an inordinate length of the rods extending externally of the tank.

Another alternative embodiment of the mechanical moving means of the invention is shown at the left of FIG. 7 and comprises pull cords 181 connected to the cleaning barrier that extend through apertures provided in the end of the support grid (similar to apertures 69 in FIG. 4), or through perforations formed in the grid (similar to perforation 29 in FIG. 4), and upwardly adjacent the sidewalls 116 of the tank so that the end 181a of the pull cord extends out of the tank and essentially hangs over the sidewall 116. This arrangement allows the tank owner to simply grasp the end 181a of the cord and pull the cord to effect movement of the cleaning barrier arranged in the lower compartment of the tank. As with the embodiments of FIG. 4, the same embodiments of the moving means will normally be used at both ends of the tank, although it is not necessary.

Pull means 180 may be provided with guide beads attached to the cords externally of the tank to indicate the location of barrier structure 21 within the lower compartment as oftentimes the movement of the barrier is not visible to the user because of the presence of the support structure. The beads are attached adjacent the ends of cords 180 and 181 so that when, for example, the cord portion extending externally to the left of the tank in FIG. 7 is pulled, thereby moving barrier structure toward the left sidewall 116 of the tank, the user may observe the guide bead attached to the right cord portion 180 and when that bead approaches right sidewall 116, this indicates to the user that the barrier structure is approaching its maximum displacement adjacent the left end of support structure 160 and left sidewall 116.

Another alternative embodiment of the invention is shown in FIG. 8 comprising pull means 280a, 280b and springs 282a, 282b each connected to barrier structures 220a, 220b. Apparatus 210 shown in FIG. 8 is substantially similar to apparatus 10 shown in FIG. 1 and like component parts of apparatus 210 correspond to the like parts of apparatus 10; that is, conduit 55 and water expelling means 40 of FIG. 1 correspond to conduit 255 and expelling means 240 of FIG. 8, and so on. In larger fish tank aquariums, it is common to employ two support grid portions 260a and 260b to define a support structure 260 as the weight of the gravel bed 262 is too great for one integral support structure to span the entire area of the bottom surface 217 of the tank. In such systems, two barrier structures 220a, 220b are often employed to define lower compartments 264a and 264b. In this embodiment, barrier structure 220a may be pulled by pull means 280a toward the left outside wall 216 of the tank to dislodge waste and debris deposited on bottom surface 217 and direct the waste-carrying water toward aperture 261a where, in the manner previously described, the water may be directed upwardly through conduit 255. When barrier structure 220a has been moved a sufficient distance to the left in FIG. 8 to substantially remove the waste and debris from the lower compartment, the tension force on pull means 280a is released, thereby allowing spring 282a, connected to the center wall portion of support 260a, to contract and pull the barrier structure toward the center of the tank. Barrier 220a will then be positioned adjacent the center portion of support 260a and ready for subsequent movement. As may be seen at the left of FIG. 8, pull cord portion 280a extends through apertures in the end of the support grid or through perforations 29 (similar to the discussion with reference to FIG. 7), and upwardly adjacent the sidewall 216 so that the end 280a' of the cord portion hangs over the sidewall 116. This allows the user to grasp the end 280a' and pull the cord to move the cleaning barrier 220a.

Likewise, attached to barrier structure 220b in the right lower compartment are spring 282b and pull means 280b that extends through fluid-tight aperture 283 in the tank side wall 216. Pull means 280b is employed to move barrier structure 220b toward the right outside wall 216 of the tank to dislodge waste and debris and direct the waste-carrying water toward aperture 261b where it may be directed upwardly through conduit 255. After this procedure is accomplished, the tension force from pull means 280b is released, permitting spring 282b to contract and pull the barrier structure 220b back toward the center of the tank to place it in a ready position for subsequent cleaning strokes. The barrier structures of the alternative embodiments shown in FIGS. 7 and 8 need not incorporate a metallic element if desired. Pull means 280a and 280b are attached to barrier structures 220a and 220b, respectively, by conventional fasteners.

Naturally, any pull means utilized in an aquatic environment should be constructed of a material resilient to water and that substantially prevents the growth of fungus and the like.

A preferred embodiment of the substantially fluid-tight aperture of FIGS. 7 and 8 is shown in FIG. 9 where aperture 182, which is formed in the sidewall 116 of the tank by conventional glass-cutting means, includes a tube 182 fitted within the walls of the orifice and which terminates at O-ring 182b which, in cooperation with tube 182a, substantially prevents fluid from passing around the pull means (not shown) extending therethrough. A hollow member 182c, which is preferably integrally connected to tube 182a, is arranged externally of the tank adjacent sidewall 116. If the pull means is provided by cord or rope (not shown in FIG. 9), the cord or rope may be wound and placed inside of the hollow member 182c for orderly storage. If desired, a cap 182d may be placed over the end of the member 182c to prevent the cord from escaping and to assist in stopping any slight leakage that may be occurring at orifice 182. Cap 182d may be threadably connected to member 182c or simply constructed to provide a frictional fit over the end of the member.

Where the pull means comprise a semi-rigid rod, the tube 182a and the O-ring 182b are preferably constructed of an elastomeric material which sealingly and slidably receives the rod or bar. Also, where the rods are extendable (telescopically or by threadably connectable portions), the rods may be contracted or the additional portion detached, and the end of the remaining portion of rod hidden from view within member 182c. Where the pull means comprises cord or rope, the tube 182a and O-ring 182b preferably include ceramic material to prevent the coarseness of the cord from damaging the surfaces thereof which may then allow leakage.

Another alternative embodiment of this invention is illustrated in FIG. 10. As previously described, in some larger fish tank systems, the support structure arranged adjacent the bottom of the tank is often times not sturdy enough to support a gravel bed or other objects placed thereon over such a large surface area and, therefore, more than one support structure may be necessary, as shown in FIG. 8, or, alternatively, a single support structure may be used which is provided with support posts extending downwardly from the underside of the support structure to the bottom surface of the tank. These support posts present a problem, however, in that a single barrier structure according to this invention, such as shown in FIG. 4, may not be used to clean the bottom surface of such tanks because the support posts present obstacles which prevent the barrier from being moved over the entire length of the tank.

As shown in FIG. 10, a means to solve this problem is to provide a plurality of barrier structures 320a and 320b within the lower compartment of the tank which act collectively to clean the bottom surface of the tank. Barrier structures 320a and 320b have a plurality of ridges 362a, 362b which mate and correspond to the underside of the support structure 60 shown in FIG. 4. To more substantially clean the bottom surface of the tank, the barrier structures are provided with side extension portions 322a and 322b which extend longitudinally from the ends of the structures. These extension portions are flexible so that when the barrier structure 320a approaches a support post 330, the extension portion engages the post and flexes increasingly backwardly as shown in FIG. 10 as the barrier moves further past the support post and thereafter rebounds back to its original position after the barrier passes the post, as shown by barrier structure 320b. As more clearly shown in FIG. 11, when arranged adjacent one another, barrier structures 320a and 320b substantially form a continuous sweeping surface to dislodge the waste and debris on the bottom surface of the tank and direct the waste toward aperture 61.

If desired, barrier structures 320a and 320b may be constructed as a single integral member with a dimple or notch or area of decreased thickness at the area where they are adjoined, i.e., the location where extensions portions 322a and 322b would join. This would allow the aquarium user to utilize the barriers collectively as a single barrier, or snap or break off barriers as required by the arrangement of the tank. For example, if support structure 60 is provided with support posts, the barriers would need to be broken apart to function as multiple barriers as shown in FIG. 10.

The preferred embodiment of the invention also provides a method for cleaning the aquarium and filtering its water supply comprising the steps of directing water upwardly from a location adjacent the bottom surface of the tank and dislodging and moving waste and debris deposited on the bottom surface of the tank toward the location. The method o this invention may further include filtering the drawn water and directing the filtered water back into the tank, or alternatively, directing the drawn water to a location external of the tank for treatment or disposal.

A primary benefit presented to the user of this invention is the variety of means by which the invention may be used to accommodate the particular cleaning needs of the individual tank or the preferences of the user. For example, referring now to FIG. 1, barrier 21 may be moved in the right direction to dislodge and direct the waste and debris toward aperture 61 until it reaches its maximum point adjacent the end of the support structure 60 and sidewall 16 to temporarily maintain the waste and debris adjacent the end of the lower compartment to be conducted out of the lower compartment at a later time. Another possible use of this system is to position barrier structure 21 adjacent an end of the support structure 60 and gently tap the end of the support structure with the barrier structure which causes more waste to settle out of the gravel through the support grid and onto the bottom surface 17. Caution should be taken in this situation, however, as the fish are sensitive to the noise and vibration caused by the tapping.

Another possible use of this invention may be practiced by placing one's hand over the upper end of conduit 55 if no water directing means 50 is used, or to form an air-tight seal on the outflow passage of water directing means 50 if such means is used, and then by moving the barrier back and forth rapidly along the bottom surface, water may be induced to flow upwardly through the gravel bed and carry any waste suspended in the lower compartment upwardly through the gravel bed where it may settle back down again in the gravel and be broken down by the bacteria living in the gravel. Moreover, this rapid action also churns the gravel which causes a greater quantity of waste to settle out of the gravel and onto the bottom surface of the tank where it may then be swept up by barrier structure 21.

The barrier structure may also be used to create a draw downwardly into the lower compartment to flush waste out of the gravel and into the lower compartment from where it may be removed or to draw waste suspended in the main water supply of the tank down into the gravel bed to be broken down by the bacteria. Also, the barrier structure may be sufficiently wide so that it may be moved directly under the aperture formed in the support grid to essentially "plug" the aperture and cut off the draw of water through that aperture.

Normally only a portion of the water within the tank will be removed from the tank during a cleaning and filtering operation. Accordingly, the use of the system of this invention renders it unnecessary to remove the fish and other objects from the tank during cleaning. Also, because only a portion of the water is removed, the water remaining in the tank will still be properly balanced chemically so that if fresh water is added to the tank, the environmental shock to the fish is lessened considerably.

The system of this invention provides excellent flexibility in the effective use of a filtration system dependent upon the filtering requirements of the tank. The barrier structure housed in the lower compartment within the tank may be moved back and forth within the lower compartment, in sliding engagement with the bottom surface of the tank, to dislodge waste collected therein and direct the water carrying the dislodged waste toward a particular location (aperture 61) where the water may be either expelled externally from the tank or merely carried upwardly to be directed back into the main water supply of the tank. In the latter circumstance, the contaminated water may first be passed through a filtering device and returned to the main water supply; or the contaminated water may be simply returned to the water supply without being passed through a filtering device when the cleaning and filtering requirements are light. In such a situation, the waste and debris eventually settle back into the gravel bed where the bacteria breaks down the inorganic waste into simple inorganic nitrogen compounds.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the following claims.

We claim:

1. A system for filtering an aquarium tank comprising:
    an aquarium tank having a bottom wall, sidewalls and a support grid arranged adjacent the bottom wall, the support grid and the bottom wall defining a lower compartment therebetween;
    a moveable barrier means positioned within the lower compartment adjacent the bottom wall of the tank;
    means for expelling waste and debris from within the lower compartment, said expelling means being an aperture formed in said support grid; and
    means for mechanically moving said barrier means along the bottom wall of the tank so that the barrier means slidably engages the bottom wall and dislodges waste and debris deposited thereon and directs the water carrying the dislodged waste and debris generally toward said expelling means to be expelled thereby, said mechanical moving means being arranged externally of said tank.

2. The filtering system as in claim 1 wherein said expelling means further comprises a conduit having one end coupled to said aperture and water directing means coupled to the other end thereof for drawing water carrying dislodged waste and debris from within the lower compartment of said tank through said conduit.

3. The filtering system as in claim 1 wherein said barrier means comprises an encapsulated metallic member, and wherein said mechanical moving means comprises a magnetic means positioned beneath the underside of the bottom wall of said tank.

4. The filtering system as in claim 3 wherein said magnetic means comprises a hand-held permanent magnet.

5. A system for cleaning an aquarium tank comprising:
    an aquarium tank having sidewalls, a bottom wall with an inner bottom surface, and a perforated support structure positioned within the tank adjacent the bottom wall and defining a lower compartment therebetween, said support structure including at least one aperture formed therein;
    means for conducting water through the at least one aperture from within the lower compartment;
    a movable barrier positioned within said lower compartment; and
    mechanical means for moving said barrier within the lower compartment so that the barrier dislodges waste and debris deposited on the inner bottom surface of the tank and directs the dislodged waste and debris generally toward said at least one aperture where the dislodged waste and debris is directed out of said lower compartment through said at least one aperture and said conducting means, said mechanical moving means being arranged externally of said tank.

6. The cleaning system as in claim 5 wherein said barrier extends from the bottom surface of the tank to substantially adjacent the underside of the support structure.

7. The cleaning system as in claim 6 wherein said support structure has a contoured underside, and wherein said barrier has an upper surface and a lower surface, the upper surface of said barrier being contoured to substantially mate with the underside of said support structure.

8. The cleaning system as in claim 5 wherein said barrier comprises a structure having a flat base adapted to rest on the inner bottom surface of said tank, said structure including a metallic element, and wherein said moving means comprises a magnetic means applied externally to the underside of the tank to pull by magnetic attraction said barrier structure along the inner bottom surface of the tank.

9. The cleaning system of claim 8 wherein said barrier structure further includes a liquid-tight casing encapsulating said structure.

10. The cleaning system as in claim 5 wherein said conducting means comprises a conduit connected to said aperture at one end and extending upwardly within the tank to conduct waste-carrying water out from within the lower compartment.

11. The cleaning system as in claim 10 wherein said conducting means further comprises water directing means connected to the other end of said conduit, said water directing means being adapted to draw water containing said dislodged waste and debris from said lower compartment through said conduit.

12. The cleaning system of claim 11 wherein said water directing means comprises an electrically powered water pump.

13. The cleaning system as in claim 11 wherein said water directing means includes:
an air pump; and
a tube arranged coaxially within said conduit,
said tube connecting to said air pump at its upper end and having its lower end arranged adjacent the bottom surface of the tank, said air pump being adapted to direct air through the tube and out the lower end thereof.

14. The cleaning system as in claim 11 wherein said water directing means includes a siphon pump.

15. The cleaning system as in claim 11 further comprising a receptacle positioned externally of the tank, said water directing means being adapted to direct water carrying said dislodged waste and debris to said receptacle to be collected therein.

16. The cleaning system as in claim 5 wherein said barrier is provided with a flexible side member extending from an end of the barrier in the direction of the longitudinal axis of said barrier, and said support structure is provided with a plurality of support posts extending between the underside of said support structure and the bottom surface of the tank,
said side member being adapted to engage said support posts as said barrier moves thereby, flex rearwardly of the barrier as said barrier continues its movement past said posts, thereby allowing the barrier to move in a substantially linear direction, and to return to an original position when the side member disengages the support posts when the barrier has completed its passing of said posts.

17. A system for cleaning and filtering an aquarium tank and the water supply retained therein comprising:
an aquarium tank having sidewalls, a bottom wall having an inner bottom surface, and a perforated support structure, said support structure being positioned adjacent the bottom wall of the tank to define a lower compartment therebetween, said support structure having at least one aperture formed therein;
conduit means communicating with said lower compartment through said at least one aperture;
a filtering device positioned externally of said tank, said filtering device being adapted to substantially remove chemical and particulate impurities from the water as the water passes therethrough;
means for directing water from within the lower compartment through said conduit to said external filtering device and back to said tank;
a movable cleaning barrier positioned within said lower compartment; and
means for moving mechanically said cleaning barrier along the inner bottom surface of the tank so that said cleaning barrier slidably engages the inner bottom surface and dislodged waste and debris collected thereon, said moving means moving said cleaning barrier and said waste and debris dislodged thereby toward said at least one aperture whereby said water directing means directs water having said waste and debris suspended therein from the lower compartment through the conduit means to said filtering device, the water being filtered by said filtering device and returned to the main water supply of the tank, said mechanical moving means being located externally of said tank.

18. The cleaning and filtering system as in claim 17 wherein said cleaning barrier comprises:
a structure having a flat base and an upper surface and including an integral metallic element; and
a casing sealably encapsulating said structure.

19. The cleaning and filtering system as in claim 18 wherein said moving means comprises a magnetic means applied externally to the underside of the tank to pull said cleaning barrier along the inner bottom surface of the tank by magnetic attraction so that said flat base is in sliding engagement therewith.

20. The cleaning and filtering system as in claim 17 wherein said water directing means comprises an electric rotor pump having an inflow passage and in outflow passage.

21. A system for cleaning an aquarium tank comprising:
an aquarium tank having sidewalls, a bottom wall with an inner bottom surface, and a perforated support structure positioned within the tank adjacent the bottom wall, said support structure defining a lower compartment between said support structure and the bottom wall of said tank and including at least one aperture formed therein, at least one said side wall having a fluid-tight aperture formed therein adjacent the bottom wall of the tank;
means for conducting water upwardly through the at least one aperture in said support structure from within the lower compartment;
a movable barrier positioned within said lower compartment; and
means for moving mechanically said barrier within the lower compartment so that the barrier dislodges waste and debris deposited on the inner bottom surface of the tank and directs the dislodged waste and debris generally toward said at least one aperture in said support structure where the dislodged waste and debris are directed out of said lower compartment through said at least one aperture in said support structure and said conducting means, said moving means being attached to said barrier and extending externally of said tank through said fluid-tight aperture.

22. The cleaning system as in claim 21 wherein moving means comprises semi-rigid rods or bars.

23. The cleaning system as in claim 21 wherein said moving means comprises flexible cords or ropes.

24. A system for cleaning an aquarium tank comprising:
   an aquarium tank having sidewalls, a bottom wall with an inner bottom surface, and a perforated support structure positioned within the tank adjacent the bottom wall, said support structure defining a lower compartment between said support structure and the bottom wall of said tank and including at least one aperture formed therein and a side portion adjacent the sidewalls of the tank and an opposite portion opposite said side portion;
   means for conducting water upwardly through the at least one aperture formed in the support structure from within the lower compartment;
   movable barriers positioned within the lower compartment;
   a biasing means engaging at one end one of the movable barriers and at the other end the opposite portion of the support structure; and
   means for moving mechanically said one barrier within the lower compartment so that the barrier dislodges waste and debris deposited on the inner bottom surface of the tank and directs the dislodged waste and debris generally toward said at least one aperture formed in said support structure where the dislodged waste and debris is directed out of said lower compartment through said at least one aperture formed in said support structure and said conducting means.

25. The cleaning system as in claim 24 wherein said biasing means is a spring member and said moving means is attached to said barrier and extending externally of said tank through a fluid-tight aperture in one of said sidewalls, said barrier being movable toward the side portion of the support structure by said moving means and being movable toward the opposite portion of said support structure by said spring member.

26. The cleaning system as in claim 24 wherein said moving means comprises flexible pull cords or ropes.

27. The cleaning system as set forth in claim 24, wherein said movable barriers each incorporate an encapsulated metallic member.

28. A method for removing waste and debris collected in a lower compartment of an aquarium tank defined by a perforated grid arranged adjacent a bottom wall of the aquarium tank, said method comprising the steps of:
   mechanically moving said waste and debris generally toward a location; and
   directing said waste and debris out from within said lower compartment,
   said moving step including the step of moving a barrier structure along the bottom wall of the tank by mechanical means arranged externally of the tank dislodge waste and debris collected on the bottom wall and to direct said waste and debris generally toward said location.

29. A method for cleaning an aquarium tank and for filtering the water supply retained therein, said tank having sidewalls, a bottom wall, and a support plate arranged adjacent the bottom wall defining a lower compartment therebetween, said bottom wall having an inner surface and an outer surface, comprising the steps of:
   dislodging particulate matter which has deposited on the inner bottom surface of the tank;
   moving said dislodged particulate matter generally toward a predetermined location;
   directing water carrying said dislodged particulate matter out from within said lower compartment; and
   directing said waste-carrying water to a second location arranged externally of said tank;
   said dislodging and said moving steps comprising moving a barrier structure arranged within the lower compartment along the inner surface of the bottom wall of said tank in sliding engagement therewith by mechanical means arranged externally of said tank.

30. The method as in claim 29 wherein said barrier structure includes a metallic component and wherein said moving step comprises moving said barrier structure by an external magnetic means applied to the outer surface of the bottom wall of said tank.

31. A system for cleaning an aquarium tank comprising:
   an aquarium tank having side walls, a bottom wall with an inner bottom surface, and a perforated support structure positioned within the tank adjacent the bottom wall, said support structure defining a lower compartment between said support structure and the bottom wall of said tank and including at least one aperture formed therein;
   means for conducting water upwardly through said at least one aperture formed in the support structure from within the lower compartment;
   movable barriers positioned within the lower compartment;
   a first force exerting means for exerting a first force on one of said movable barriers in a first direction; and
   second force exerting means for selectively exerting a second force on said one barrier in a second, opposite direction, said second force being stronger than said first force for moving said one barrier within the lower compartment so that the barrier dislodges waste and debris deposited on the inner bottom surface of the tank and directs the dislodged waste and debris generally toward said at least one aperture formed in said support structure where the dislodged waste and debris is directed out of said lower compartment through said at least one aperture formed in said support structure and said conducting means.

* * * * *

UNITED STATES PATENT AND TRADEMARK OFFICE
CERTIFICATE OF CORRECTION

PATENT NO. : 5,199,378
DATED : April 6, 1993
INVENTOR(S) : William E. Kissick Jr., It is certified that error appears in the above-indentified patent and that said Letters Patent is hereby corrected as shown below:

On the Title Page, item [76], Inventors: should read
   --William E. Kissick, Jr.; 911 Cramer Ave: Apt. 1, Lexington, Ky  40502

Signed and Sealed this

Fourth Day of January, 1994

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,199,378
DATED : April 6, 1993
INVENTOR(S) : William E. kissick, Jr.

It is certified that error appears in the above-indentified patent and that said Letters Patent is hereby corrected as shown below:

Column 5, line 33, "an" should read -- and --. (second occurrence).

Column 12, line 50, "o" should read --of--.

Signed and Sealed this

Thirtieth Day of August, 1994

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,199,378
DATED : April 6, 1993
INVENTOR(S) : William E. Kissick, Jr.

It is certified that error appears in the above-identified patent and that said Letters Patent is hereby corrected as shown below:

ABSTRACT

Line 6, before "mechanism" insert -- a --
Line 12, "moving means" should read -- the moving mechanism --

Signed and Sealed this

Twenty-first Day of February, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,199,378                    Page 1 of 4
DATED      : April 6, 1993
INVENTOR(S): William E. Kissick, Jr.

It is certified that error appears in the above-indentified patent and that said Letters Patent is hereby corrected as shown below:

Columns 15-18 should be deleted and substitute therefor the attached columns 15-20.

Column 17, line 29, "cummunicating" should read --communicating--.

Signed and Sealed this

Twenty-fifth Day of April, 1995

Attest:

BRUCE LEHMAN

*Attesting Officer*      *Commissioner of Patents and Trademarks*

8. The cleaning system as in claim 5 wherein said barrier comprises a structure having a flat base adapted to rest on the inner bottom surface of said tank, said structure including a metallic element, and wherein said moving means comprises a magnetic means applied externally to the underside of the tank to pull by magnetic attraction said barrier structure along the inner bottom surface of the tank.

9. The cleaning system of claim 8 wherein said barrier structure further includes a liquid-tight casing encapsulating said structure.

10. The cleaning system as in claim 5 wherein said conducting means comprises a conduit connected to said aperture at one end and extending upwardly within the tank to conduct waste-carrying water out from within the lower compartment.

11. The cleaning system as in claim 10 wherein said conducting means further comprises water directing means connected to the other end of said conduit, said water directing means being adapted to draw water containing said dislodged waste and debris from said lower compartment through said conduit.

12. The cleaning system of claim 11 wherein said water directing means comprises an electrically powered water pump.

13. The cleaning system as in claim 11 wherein said water directing means includes:
an air pump; and
a tube arranged coaxially within said conduit,
said tube connecting to said air pump at its upper end and having its lower end arranged adjacent the bottom surface of the tank, said air pump being adapted to direct air through the tube and out the lower end thereof.

14. The cleaning system as in claim 11 wherein said water directing means includes a siphon pump.

15. The cleaning system as in claim 11 further comprising a receptacle positioned externally of the tank, said water directing means being adapted to direct water carrying said dislodged waste and debris to said receptacle to be collected therein.

16. The cleaning system as in claim 5 wherein:
said barrier is provided with a flexible side member extending from an end of said barrier in the direction of the longitudinal axis of said barrier, and said support structure is provided with a plurality of support posts extending between the underside of said support structure and the bottom surface of said tank;
and said flexible side member being adapted to engage at least one of said support posts as said barrier moves thereby, flex rearwardly of said barrier as said barrier continues its movement past said at least one support post, thereby allowing said barrier to move in a substantially linear direction, and to return to an original position when said flexible side member disengages said at least one support post when said barrier has completed its passing of said at least one support post.

17. A system for cleaning and filtering an aquarium tank and the water supply retained therein comprising:
an aquarium tank having sidewalls, a bottom wall having an inner bottom surface, and a perforated support structure, said support structure being positioned adjacent the bottom wall of the tank to define a lower compartment therebetween, said support structure having at least one aperture formed therein;
conduit means communicating with said lower compartment through said at least one aperture;
a filtering device positioned externally of said tank, said filtering device being adapted to substantially remove chemical and particulate impurities from the water as the water passes therethrough;
means for directing water from within the lower compartment through said conduit to said external filtering device and back to said tank;
a movable cleaning barrier positioned within said lower compartment; and
means for moving mechanically said cleaning barrier along the inner bottom surface of the tank so that said cleaning barrier slidably engages the inner bottom surface and dislodged waste and debris collected thereon, said moving means moving said cleaning barrier and said waste and debris dislodged thereby toward said at least one aperture whereby said water directing means directs water having said waste and debris suspended therein from the lower compartment through the conduit means to said filtering device, the water being filtered by said filtering device and returned to the main water supply of the tank, said mechanical moving means being activated externally of said tank.

18. The cleaning and filtering system as in claim 17 wherein said cleaning barrier comprises:
a structure having a flat base and an upper surface and including an integral metallic element; and
a casing sealably encapsulating said structure.

19. The cleaning and filtering system as in claim 18 wherein said moving means comprises a magnetic means applied externally to the underside of the tank to pull said cleaning barrier along the inner bottom surface of the tank by magnetic attraction so that said flat base is in sliding engagement therewith.

20. The cleaning and filtering system as in claim 17 wherein said water directing means comprises an electric rotor pump having an inflow passage and an outflow passage.

21. A method for removing waste and debris collected in a lower compartment of an aquarium tank defined by a perforated grid arranged adjacent a bottom wall of the aquarium tank, said method comprising the steps of:
moving said waste and debris generally toward a location; and
directing said waste and debris out from within said lower compartment,
said moving step including the step of moving a barrier structure along the bottom wall of the tank by force exerting means activated externally of the tank to dislodge waste and debris collected on the bottom wall and to direct said waste and debris generally toward said location.

22. A method for cleaning an aquarium tank and for filtering the water supply retained therein, said tank having sidewalls, a bottom wall, and a support plate arranged adjacent the bottom wall defining a lower compartment therebetween, said bottom wall having an inner surface and an outer surface, comprising the steps of:
dislodging particulate matter which has deposited on the inner bottom surface of the tank;
moving said dislodged particulate matter generally toward a predetermined location;

directing water carrying said dislodged particulate matter out from within said lower compartment; and directing said waste-carrying water to a second location arranged externally of said tank;

said dislodging and said moving steps comprising moving a barrier structure arranged within the lower compartment along the inner surface of the bottom wall of said tank in sliding engagement therewith by mechanical means activated externally of said tank.

23. The method as in claim 22 wherein said barrier structure includes a metallic component and wherein said moving step comprises moving said barrier structure by an external magnetic means applied to the outer surface of the bottom wall of said tank.

24. A system for cleaning an aquarium tank comprising:

an aquarium tank having:
  side walls;
  a bottom wall including an inner bottom surface;
  a support structure positioned within said tank adjacent said bottom wall, said support structure and said bottom wall defining a lower compartment therebetween;
  and at least one of said side walls having a fluid-tight aperture formed therein adjacent said bottom wall of said tank;

communicating means for communicating said lower compartment with the portion of said tank above said support structure;

means for expelling waste and debris from within said lower compartment;

at least one movable barrier positioned within said lower compartment;

and means for moving mechanically said at least one movable barrier within said lower compartment so that said at least one movable barrier dislodges waste and debris deposited on said inner bottom surface of said tank and directs the dislodged waste and debris generally toward said expelling means to be expelled thereby, said moving means being attached to said at least one movable barrier and extending externally of said tank through said fluid-tight aperture.

25. The cleaning system as in claim 24 wherein said moving means comprises semi-rigid rods or bars.

26. The cleaning system as in claim 24 wherein said moving means comprises flexible cords or ropes.

27. A system for cleaning an aquarium tank comprising:

an aquarium tank having:
  side walls;
  a bottom wall including an inner bottom surface;
  and a support structure positioned within said tank adjacent said bottom wall, said support structure and said bottom wall defining a lower compartment therebetween;

communicating means for communicating said lower compartment with the portion of said tank above said support structure;

means for expelling waste and debris from within said lower compartment;

at least one movable barrier positioned within said lower compartment;

biasing means having one of its ends engaging said at least one movable barrier and its other end engaging said support structure for continuously urging said at least one movable barrier to a rest position;

and means for moving mechanically said at least one movable barrier within said lower compartment from its rest position so that said at least one movable barrier dislodges waste and debris deposited on said inner bottom surface of said tank and directs the dislodged waste and debris generally toward said expelling means to be expelled thereby.

28. The cleaning system as set forth in claim 27, wherein said at least one movable barrier incorporates an encapsulated metallic member.

29. The cleaning system according to claim 27 in which:
  said biasing means is a spring member;
  one of said side walls includes a fluid-tight aperture;
  and said moving means is attached to said at least one movable barrier and extends externally of said tank through said fluid-tight aperture in said one side wall.

30. The cleaning system as in claim 29 wherein said moving means comprises flexible pull cords or ropes.

31. A system for cleaning an aquarium tank comprising:

an aquarium tank having:
  side walls;
  a bottom wall including an inner bottom surface;
  and a support structure positioned within said tank adjacent said bottom wall, said support structure and said bottom wall defining a lower compartment therebetween;

communicating means for communicating said lower compartment with the portion of said tank above said support structure;

means for expelling waste and debris from within said lower compartment;

at least one movable barrier positioned within said lower compartment;

first force exerting means for exterting a first force on said at least one movable barrier in a first direction;

and second force exerting means for selectively exerting a second force on said at least one barrier in a second, opposite direction, said second force being stronger than said first force for moving said at least one barrier within said lower compartment so that said at least one barrier dislodges waste and debris deposited on said inner bottom surface of said tank and directs the dislodged waste and debris generally toward said expelling means to be expelled thereby.

32. A system for cleaning an aquarium tank comprising:

an aquarium tank having:
  side walls;
  a bottom wall including an inner bottom surface;
  and a support structure positioned with said tank adjacent the bottom wall, said support structure and said bottom wall defining a lower compartment therebetween;

communicating means for communicating said lower compartment with the portion of said tank above said support structure;

suction means for applying a suction at a selected location within said lower chamber;

single movable means disposed in said lower compartment for dislodging waste and debris deposited on said inner bottom surface of said tank to direct the dislodged waste and debris generally toward the selected location and simultaneously reducing the volume of said lower chamber subjected to said suction means at the selected location to increase the effect of said suction means as the quantity of dislodged waste and debris increases at the selected location due to movement of said single movable means;

and means for causing selective movement of said single movable means toward the selected location.

* * * * *